US005113949A

United States Patent [19]

[11] Patent Number: 5,113,949

[45] Date of Patent: May 19, 1992

Ohkubo et al.

[54] TIGHTENING CONTROL APPARATUS FOR A TORQUE WRENCH

[75] Inventors: Masaaki Ohkubo; Ryo Fukada, both of Osaka, Japan

[73] Assignee: Fuji Kuuki Kabushiki Kaisha, Osaka, Japan

[21] Appl. No.: 386,663

[22] Filed: Jul. 31, 1989

[30] Foreign Application Priority Data

Oct. 12, 1988 [JP] Japan .............................. 63-257957

[51] Int. Cl.[5] .............................................. B23Q 5/00

[52] U.S. Cl. .................................. 173/177; 73/862.58

[58] Field of Search ...................... 173/12, 20, 2, 8, 9; 73/862.21, 862.37, 862.58

[56] References Cited

U.S. PATENT DOCUMENTS

| | | | |
|---|---|---|---|
| 2,978,903 | 4/1961 | Nicholas | 73/862.37 |
| 4,163,310 | 8/1979 | Sigmund | 173/12 |
| 4,418,765 | 12/1983 | Mori et al. | 173/12 X |
| 4,571,696 | 2/1986 | Bitzer | 173/12 X |
| 4,858,312 | 8/1989 | Van Naarden | 173/12 X |
| 4,887,499 | 12/1989 | Kipfelsberger | 173/12 X |

*Primary Examiner*—Timothy V. Eley
*Assistant Examiner*—Willmon Fridie, Jr.
*Attorney, Agent, or Firm*—Armstrong, Nikaido, Marmelstein, Kubovcik & Murray

[57] ABSTRACT

Disclosed is a tightening control apparatus for a torque wrench including a pressure detecting device for detecting an admission pressure supplied to a torque wrench. A pressure change detecting device determines a change in pressure detected by the pressure detecting device. A striking signal output device outputs a striking signal when the change reaches a reference value.

4 Claims, 3 Drawing Sheets

TIGHTENING CONTROL APPARATUS FOR A TORQUE WRENCH

BACKGROUND OF THE INVENTION

This invention relates to torque wrenches such as an impact wrench and a hydraulic wrench.

In utilization of an impact wrench, it is necessary to detect the striking state in order to accurately control the tightening torque or accurately grasp the number of tightened nuts. Conventionally, the striking state is detected by detecting the reverse rotation of the main shaft of an air motor using a sensor mounted to this main shaft. However, since this method requires that the sensor to detect the forward and reverse rotations of the main shaft to be disposed within the impact wrench, it has disadvantages that the machine would be enlarged and its cost would be increased.

For solving such a problem, a system can be used which detects an admission pressure and detects the striking state as the impact wrench is activated when the admission pressure falls below a reference level. With the use of this system, however, it is not possible to discriminate whether the impact wrench is in free running (no-loaded rotating) state or striking state. This is because the difference between the pressures generated in free running state and striking state is smaller than a variation in pressure which is inevitably caused in the admission source, thus making it impossible to distinguish one state from the other.

SUMMARY OF THE INVENTION

Accordingly, it is a primary object of this invention to provide a tightening control apparatus for a torque wrench, which can accurately detect the striking state of the torque wrench with accuracy and also with a simple arrangement.

It is another object of this invention to provide a tightening control apparatus for an torque wrench, which can accurately execute the tightening torque control of the torque wrench.

It is a further object of this invention to provide a tightening control apparatus for an torque wrench, which can accurately grasp the number of tightened nuts under the above accurate torque control.

According to one aspect of this invention, there is provided a tightening control apparatus for a torque wrench which comprises:

a pressure detecting device for detecting an admission pressure supplied to a torque wrench;

a pressure change detecting device for grasping a change in pressure detected by the pressure detecting device; and a striking signal output device for outputting a striking signal when the change reaches a reference value.

According to a modification of the tightening control apparatus, the striking signal output device is designed such that it may continuously output the striking signal for a predetermined period of time after the change reaches the reference value. A signal output time altering device is further provided to alter the signal output time.

According to another modification, the tightening control apparatus of the first modification may further comprise a counter for setting the signal output time shorter than the striking interval, counting the striking signal and outputting a tightening end signal when a count value reaches a set value; and an admission stop device for closing an admission path to the torque wrench upon reception of the tightening end signal.

The aforementioned first modification of the tightening control apparatus may further comprise a timer for setting the signal output time greater than the striking interval, measuring a time during which the striking signal is continuously output and outputting a tightening end signal when the measured time reaches a set time; and an admission stop device for closing an admission path to the torque wrench upon reception of the tightening end signal.

According to the fourth modification, the second modification or the third modification of the tightening control apparatus may further comprise a number counter device for counting the tightening end signal and outputting a predetermined number tightening end signal when a count value reaches a set number.

According to the tightening control apparatus mentioned firstly, the admission pressure is kept at a specific level during free running and does not vary with time, so that the striking signal will not be produced. In a striking state, however, a certain degree or more of change occurs in the admission pressure for each striking and the striking signal is produced in accordance with the change. An advantage of this apparatus is that, unlike the conventional system of detecting the admission pressure, the striking state is detected from a change in admission pressure, thus ensuring the accurate detection of the striking state with a simple structure.

The second modification of the tightening control apparatus counts the number of produced striking signals and the third modification measures the time during which the striking signal is continuously produced. According to either modification, when the count value or the measured time reaches a set value, admission is stopped, thereby to ensure the accurate tightening torque control. If the second and third modifications further have the signal output time altering device as provided in the first modification, the detecting systems of the second and third modifications may be switched from one to the other as needed. This further improves the accuracy of the torque control.

According to the fourth modification, the tightening control apparatus can measure the number of tightened nuts and can detect that this number reaches a set number, thus ensuring the accurate management of tightened nuts numbers in addition to the accurate torque control.

BRIEF DESCRIPTION OF THE DRAWINGS

The foregoing objects, advantages and other features will become more apparent from the detailed description of a preferred embodiment of this invention with reference to the accompanying drawings in which.

DESCRIPTION OF THE PREFERRED EMBODIMENT

Figure 1:
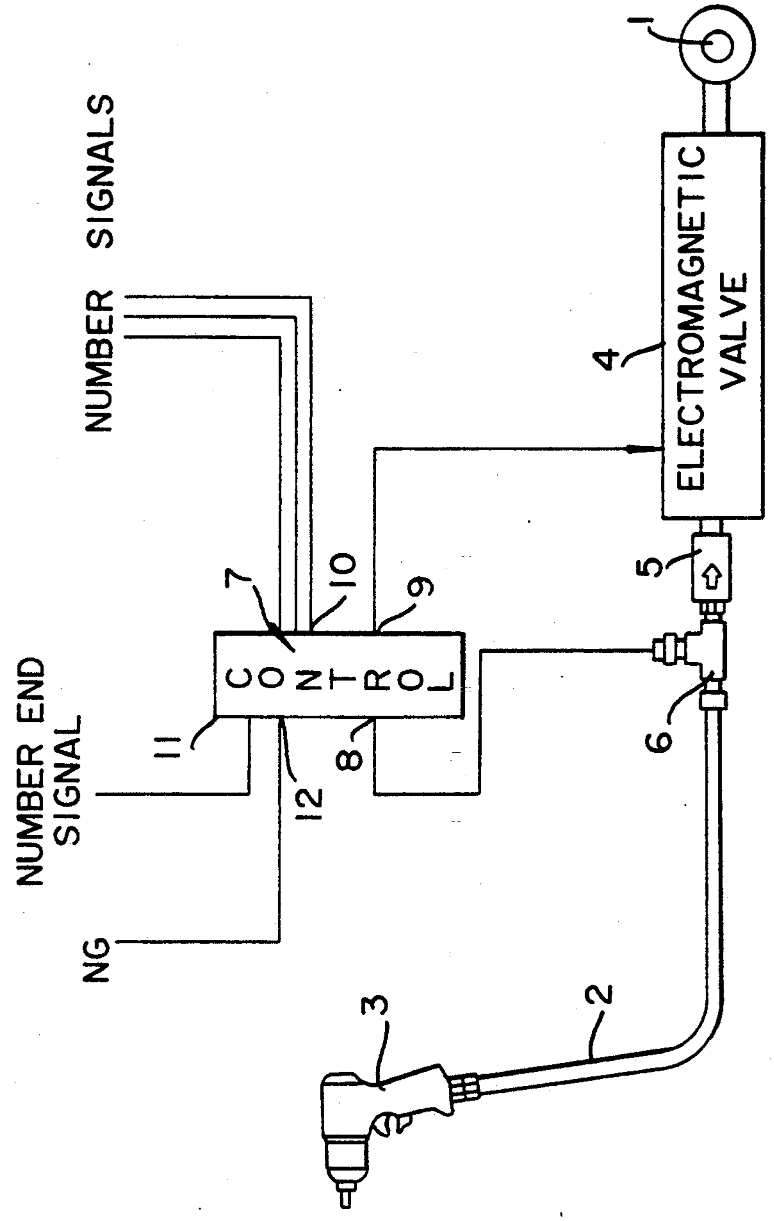
FIG. 1 is a diagram illustrating the general arrangement of a tightening control apparatus for a torque wrench according to the preferred embodiment.

In FIG. 1 illustrating the general arrangement of the present apparatus, reference numeral 1 denotes an admission source, reference numeral 2 an air hose, and reference numeral 3 an impact wrench. The air hose 2 is provided with an electromagnetic valve 4, a check valve 5 and a pressure transducer 6 in order from the side of the admission source 1. The check valve 5 serves to prevent problems originating from reduction in pressure at the part of the admission source 1. Referring to the same diagram, reference numeral 7 denotes a controller 7, which comprises an input port 8 coupled to the pressure transducer 6, an output port 9 coupled to the electromagnetic valve 4, a plurality of input ports 10 . . . which receive data with respect to a set number, and output ports 11 and 12 which respectively output a predetermined-number tightening end signal and an NG signal.

Figure 2:
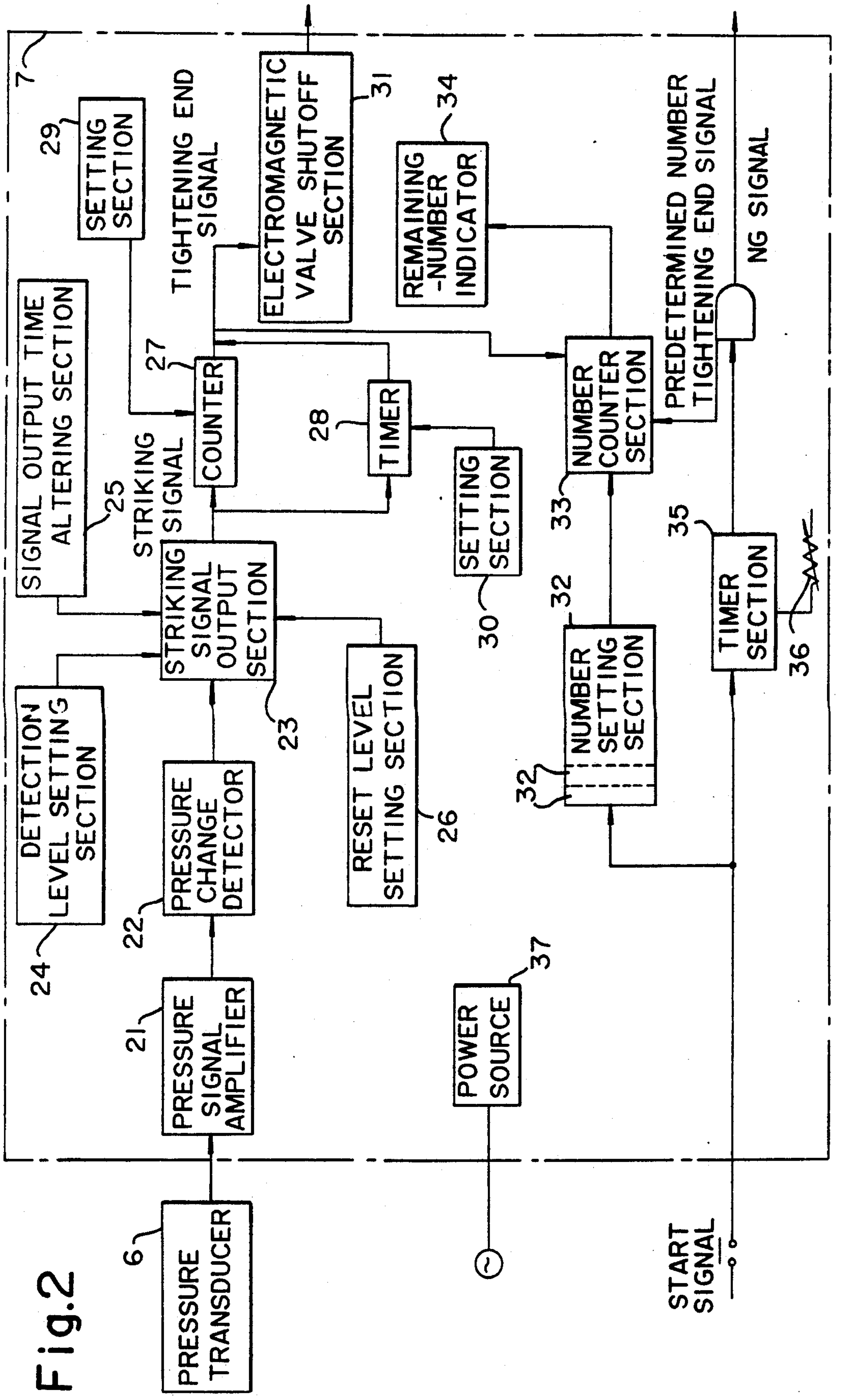
FIG. 2 is a block diagram illustrating a control system of the apparatus.

FIG. 2 is a functional block diagram of the controller 7. A pressure signal from the pressure transducer 6 is input to a pressure signal amplifier 21 and is supplied therefrom to a pressure change detector 22 and a striking signal output section 23. The striking signal output section 23 has a detection level setting section 24, a signal output time altering section 25 and a reset level setting section 26, and it outputs a striking signal. (The function of this section 23 will be described later.) The number of the striking signals output from the section 23 is measured by a counter 27 and the time during which the striking signal is continuously output is measured by a timer 28. When the measured values reach values set in associated setting sections 29 and 30, a tightening end signal is output. Based on the tightening end signal, an electromagnetic valve shutoff section 31 closes the electromagnetic valve 4.

The controller 7 further comprises a number setting section 32 constituted by digital switches and a counter section 33 which counts the tightening end signal. When the count value reaches a value set in the section 32, a predetermined-number tightening end signal is output from the counter section 33, thereby to stop a sequence of a tightening operation. Reference numeral 34 denotes a remaining-number indicator, which indicates how many nuts are left to be tightened by means of LEDs (light-emitting diodes). The number setting section 32 may be one or more than one in quantity. The controller 7 further has a timer section 35 which is reset by a start signal produced at the time a sequence of a tightening operation starts. When no predetermined-number tightening end signal is output within a predetermined time after the timer section 35 is reset, an NG signal is produced. Reference numeral 36 denotes a timer adjusting section and reference numeral 37 a power source.

Figure 3:
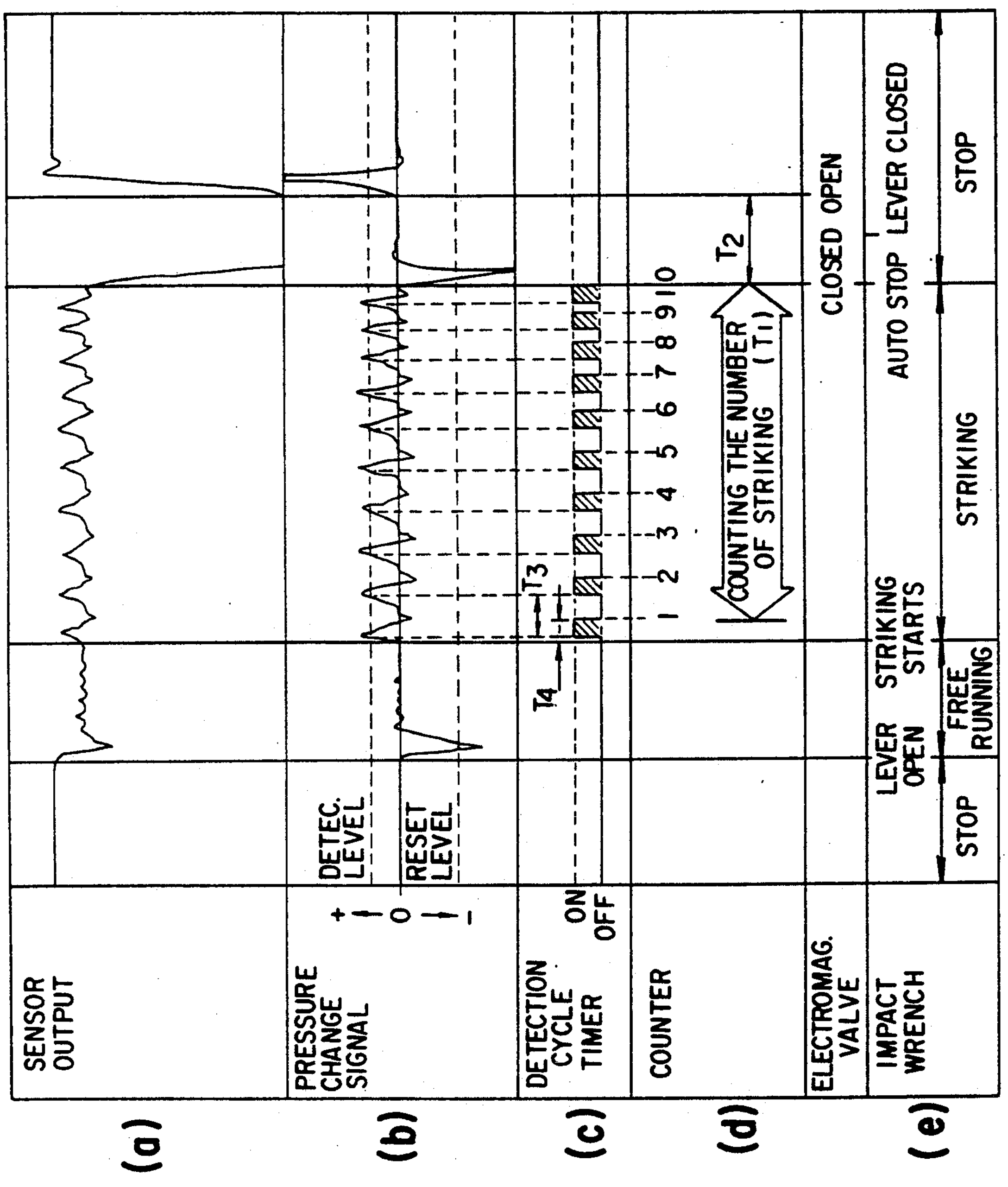
FIG. 3 is a time chart illustrating operational states of the control system.

Referring to FIG. 3, the operation states of the abovedescribed controller 7 will be explained below. Referring to (a) in FIG. 3 illustrating the output signal from the pressure transducer 6, the pressure change detector 22 extracts an AC component only from this output signal as a pressure change signal. This pressure change signal has such a characteristic that it does not vary when the impact wrench is stopped, has a large negative variation when the lever is open, has a minute positive and negative variation when the impact wrench is in a free running state, and repeats a large positive variation and a small negative variation for each striking (as can be seen in (b) of FIG. 3). In this connection, when the negative variation caused upon opening of the lever reaches a reset level set in the reset level setting section 26, the striking signal output section 23 resets the counter 27 or timer 28 and starts detecting the striking state.

A description will now be given with respect to the case where the counter 27 counts the number of strikes. When a positive variation equal to or greater than the detection level set in the detection level setting section 24, i.e., when striking occurs, the striking signal output section 23 outputs the striking signal for a predetermined time $T_4$ as shown in (c) of FIG. 3. Assume now that this signal output time $T_4$, which is set by the signal output time altering section 25, is set shorter than a striking interval $T_3$. The number of the striking signals output is counted by the counter 27. When the count value reaches the set value, the tightening end signal is output from the counter 27, thereby to close the electromagnetic valve 4 followed by the closing of the lever (see (d) and (e) of FIG. 3). Upon the lapse of a predetermined time $T_2$ after the electromagnetic valve 4 is closed, this valve 4 is automatically opened. When the above tightening operation is repeated by a predetermined number of times and the number of the tightening end signals counted by the counter section 33 reaches the set value, the predetermined-number tightening end signal is output from the section 33. This completes a tightening operation sequence.

A description will now be given with respect to the case where the signal output time $T_4$ is set greater than the striking interval $T_3$ in the signal output time altering section 25. In this case, the striking signal is output as a sequence of signals from the first striking. Thus, when the continuous signal output time measured in the timer 28 reaches the set time $T_1$, the tightening end signal is output from the timer 28. The operation state thereafter is the same as described in the previous case.

The foregoing description discusses the tightening control apparatus for a torque wrench according to one embodiment of this invention. Needless to say, the present apparatus is in no way restricted to this particular embodiment, but may be modified in various manners within the scope and spirit of the invention. For instance, some modification may be made in such a way that when the striking interval $T_3$ is detected to be greater than a reference time, this event is discriminated to be a disturbance, not an occurrence of striking, and countermeasure can be taken by resetting the counter 27 or timer 28.

What is claimed is:

1. A tightening control apparatus for a torque wrench comprising:

a pressure detecting means for detecting an admission pressure supplied to a torque wrench;

a pressure change detecting means for detecting a change in admission pressure detected by said pressure detecting means;

a striking signal output means for outputting a striking signal when the change in pressure reaches a reference value, wherein said striking signal output means continuously outputs said striking signal for a predetermined period of time after said change reaches the reference value, and said predetermined period of time is set shorter than a striking interval;

a counter for counting said striking signal and for outputting a tightening end signal when a count value reaches a set value; and an admission stop means for closing an admission pressure path to said torque wrench upon reception of said tightening end signal.

2. A tightening control apparatus for a torque wrench comprising:

a pressure detecting means for detecting an admission pressure supplied to a torque wrench;

a pressure change detecting means for detecting a change in admission pressure detected by said pressure detecting means;

a striking signal output means for outputting a striking signal when the change in pressure reaches a reference value, wherein said striking signal output means continuously outputs said striking signal for a predetermined period of time after said change reaches the reference value, and said predetermined period of time is set greater than said striking interval;

a timer for measuring a time during a which said striking signal is continuously output and for outputting a tightening end signal when said measured time reaches a set time; and an admission stop means for closing an admission pressure path to said torque wrench upon reception of said tightening end signal.

3. The apparatus according to claims 1 or 2, wherein said apparatus further comprises a signal output time altering means for altering said predetermined period of time.

4. An apparatus according to claims 1 or 2 further comprising a counter means for counting said tightening end signal and for outputting a predetermined-number tightening end signal when a count value reaches a set number.

* * * * *